(12) United States Patent
Lee et al.

(10) Patent No.: US 10,535,890 B2
(45) Date of Patent: Jan. 14, 2020

(54) POLYMER ELECTROLYTE MEMBRANE, METHOD FOR FABRICATING SAME, AND MEMBRANE-ELECTRODE ASSEMBLY COMPRISING SAME

(71) Applicant: KOLON INDUSTRIES, INC., Gwacheon-si, Gyeonggi-do (KR)

(72) Inventors: Moo Seok Lee, Yongin-si (KR); Dong Hoon Lee, Yongin-si (KR); Yong Cheol Shin, Yongin-si (KR); Na Young Kim, Yongin-si (KR); Eun Su Lee, Yongin-si (KR); Han Moon Cho, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 605 days.

(21) Appl. No.: 15/025,657

(22) PCT Filed: Sep. 30, 2014

(86) PCT No.: PCT/KR2014/009149
§ 371 (c)(1),
(2) Date: Mar. 30, 2016

(87) PCT Pub. No.: WO2015/047008
PCT Pub. Date: Apr. 2, 2015

(65) Prior Publication Data
US 2016/0260995 A1    Sep. 8, 2016

(30) Foreign Application Priority Data

Sep. 30, 2013 (KR) .................... 10-2013-0116257

(51) Int. Cl.
*H01M 8/1018* (2016.01)
*H01M 8/1041* (2016.01)
(Continued)

(52) U.S. Cl.
CPC ....... *H01M 8/1041* (2013.01); *H01M 8/1004* (2013.01); *H01M 8/1018* (2013.01);
(Continued)

(58) Field of Classification Search
CPC . H01M 2008/1095; H01M 2300/0082; H01M 8/0293; H01M 8/1004;
(Continued)

(56) References Cited

U.S. PATENT DOCUMENTS

2002/0015875 A1* 2/2002 Kim ........................ H01B 1/122
429/450
2002/0091225 A1* 7/2002 McGrath .............. B01D 69/141
528/170
(Continued)

FOREIGN PATENT DOCUMENTS

EP   2 515 368    10/2012
JP   2013064080 A   4/2013
(Continued)

OTHER PUBLICATIONS

Maria Gil, et al., "Direct synthesis of sulfonated aromatic poly(ether ether ketone) proton exchange membranes for fuel cell applications", Journal of Membrane Science, 2004, pp. 75-81, vol. 234.
(Continued)

*Primary Examiner* — Lucas J. O'Donnell
(74) *Attorney, Agent, or Firm* — Sughrue Mion, PLLC

(57) ABSTRACT

Provided are a polymer electrode membrane including a porous support including a web of nanofibers of a first hydrocarbon-based ion conductor that are arranged irregularly and discontinuously; and a second hydrocarbon-based ion conductor filling the pores of the porous support, the first hydrocarbon-based ion conductor being a product obtained by eliminating at least a portion of the protective groups (Y)
(Continued)

in a precursor of the first hydrocarbon-based ion conductor represented by Formula (1), a method for producing the polymer electrolyte membrane, and a membrane electrode assembly including the polymer electrolyte membrane:

[Chemical Formula 1]

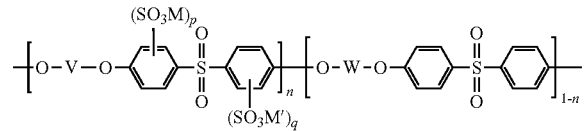

wherein m, p, q, M, M', X and Y respectively have the same meanings as defined in the specification.

5 Claims, 1 Drawing Sheet

(51) Int. Cl.
  *H01M 8/1004* (2016.01)
  *H01M 8/1027* (2016.01)
  *H01M 8/1032* (2016.01)
  *H01M 8/1069* (2016.01)
  *H01M 8/1081* (2016.01)

(52) U.S. Cl.
  CPC ....... *H01M 8/1027* (2013.01); *H01M 8/1032* (2013.01); *H01M 8/1079* (2013.01); *H01M 8/1081* (2013.01); *H01M 2008/1095* (2013.01); *H01M 2300/0082* (2013.01)

(58) Field of Classification Search
  CPC ............. H01M 8/1018; H01M 8/1027; H01M 8/1032; H01M 8/1041; H01M 8/1069; H01M 8/1079; H01M 8/1081; Y02P 70/56
  See application file for complete search history.

(56) References Cited

U.S. PATENT DOCUMENTS

| | | | |
|---|---|---|---|
| 2009/0148751 A1* | 6/2009 | Choi | H01M 4/8605 |
| | | | 429/483 |
| 2009/0208806 A1* | 8/2009 | Izuhara | C08G 65/4056 |
| | | | 429/450 |
| 2010/0227247 A1 | 9/2010 | Pintauro et al. | |
| 2012/0231355 A1 | 9/2012 | Lee et al. | |
| 2013/0101918 A1 | 4/2013 | Yandrasits et al. | |
| 2013/0280642 A1* | 10/2013 | Gummalla | C08J 5/22 |
| | | | 429/492 |
| 2015/0094446 A1* | 4/2015 | Chen | C07C 309/44 |
| | | | 528/226 |

FOREIGN PATENT DOCUMENTS

| | | |
|---|---|---|
| KR | 10-2010-0026237 A | 3/2010 |
| KR | 10-2011-0120185 A | 11/2011 |
| KR | 10-2012-0078363 A | 7/2012 |
| KR | 1020120127548 A | 11/2012 |
| WO | 02/25764 A1 | 3/2002 |

OTHER PUBLICATIONS

Kyungseok Yoon, et al., "Fabrication and Characteristics of Partially Covalent-crosslinked Poly(arylene ether sulfone)s for Use in a Fuel Cell", Membrane Journal, Dec. 2008, pp. 274-281, vol. 18, No. 4.

International Searching Authority, International Search Report of PCT/KR2014/009149, dated Jan. 22, 2015. [PCT/ISA/210].

International Searching Authority, Written Opinion of PCT/KR2014/009149, dated Jan. 22, 2015. [PCT/ISA/237].

European Patent Office, Communication dated Mar. 14, 2017 by the European Patent Office in European Application No. 14 84 8704.

Korean Intellectual Property Office, Communication dated Apr. 29, 2019, issued in Application No. 10-2013-0116257.

* cited by examiner

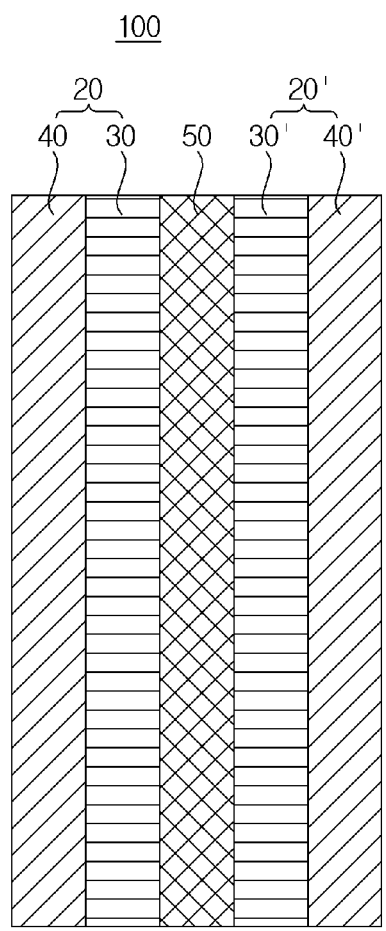

POLYMER ELECTROLYTE MEMBRANE, METHOD FOR FABRICATING SAME, AND MEMBRANE-ELECTRODE ASSEMBLY COMPRISING SAME

CROSS REFERENCE TO RELATED APPLICATIONS

This application is a National Stage of International Application No. PCT/KR2014/009149 filed Sep. 30, 2014, claiming priority based on Korean Patent Application No. 10-2013-0116257, filed Sep. 30, 2013, the contents of all of which are incorporated herein by reference in their entirety.

BACKGROUND OF THE INVENTION

Field of the Invention

The present invention relates to a polymer electrolyte membrane, a method for producing the same, and a membrane electrode assembly including the same.

Description of Related Art

Fuel cells are electrochemical cells capable of directly converting chemical energy that is generated by oxidation of fuel to electric energy, and fuel cells have been highly expected as the next-generation energy sources due to their environment-friendly features such as high energy efficiency and reduced emission of contaminants.

Generally, a fuel cell has a structure in which an electrolyte membrane is interposed between an oxidation electrode (anode) and a reduction electrode (cathode), and such a structure is referred to as a membrane electrode assembly (MEA).

Fuel cells can be classified into alkaline electrolyte fuel cells, polymer electrolyte membrane fuel cells (PEMFC), and the like, and among them, polymer electrolyte membrane fuel cells are attracting much attention as portable, automotive and domestic power supply devices due to the advantages such as a low operating temperature of lower than 100° C., rapid starting and responding characteristics, and excellent durability.

A representative example of such polymer electrolyte membrane fuel cells is a proton exchange membrane fuel cell (PEMFC) that uses hydrogen gas as a fuel.

To briefly describe the reaction occurring in a polymer electrolyte membrane fuel cell, first, when a fuel such as hydrogen gas is supplied to an anode, protons (H+) and electrons (e−) are produced by an oxidization reaction of hydrogen at the anode. The protons (H+) thus produced are delivered to a cathode through a polymer electrolyte membrane, and the electron (e−) thus produced are delivered to the cathode through an external circuit. Oxygen is supplied to the cathode, and oxygen binds to the protons (H+) and electrons (e−) so that water is produced as a result of a reduction reaction of oxygen.

Since the polymer electrolyte membrane is a channel through which protons (H+) produced at the anode are delivered to the cathode, basically, the polymer electrolyte membrane should have excellent conductivity for protons (H+). Furthermore, a polymer electrolyte membrane should have excellent separation performance of separating protons that are supplied to the anode and oxygen that are supplied to the cathode, and in addition to that, a polymer electrolyte membrane should have excellent mechanical strength, dimensional stability, chemical resistance, and the like. Also, a polymer electrolyte membrane needs to have characteristics such as a small ohmic loss at a high current density.

One class of the fluororesins that are currently used for polymer electrolyte membranes is perfluorosulfonic acid resins (hereinafter, referred to as "fluorine-based ion conductors"). However, fluorine-based ion conductors have weak mechanical strength, and thus have a problem that when the fluorine-based ion conductors are used for a long time period, pinholes are generated, and therefore, the energy conversion efficiency is decreased. There have been attempts to use a fluorine-based ion conductor having an increased membrane thickness, in order to intensify the mechanical strength; however, in this case, there is a problem that the ohmic loss is increased, expensive materials should be used in larger quantities, and thus economic efficiency is decreased.

In order to ameliorate the disadvantages of the fluorine-based ion conductors such as described above, development of hydrocarbon-based ion conductors has been actively conducted in recent years. However, because a polymer electrolyte membrane repeatedly undergoes expansion and contraction in a wet or dry state, which is a condition for operation of a fuel cell, hydrocarbon-based polymer electrolyte membranes that have high percent water contents due to their structures have a disadvantage that the long-term durability of the membrane is poor due to low dimensional stability and low tensile strength.

In order to solve such problems, there has been proposed a polymer electrolyte membrane in the form of a reinforced membrane in which mechanical strength has been enhanced by introducing a support as a reinforcing agent into the hydrocarbon-based ion conductor. Regarding the support, a non-ion-conductive hydrophobic hydrocarbon-based polymer support is mainly used. When such a hydrophobic support is used, dimensional stability is improved, and as a result, mechanical properties such as tensile strength can be secured even after the ion conductor has absorbed moisture, while the film thickness can be minimized for the purpose of minimizing the membrane resistance and enhancing the performance.

On the other hand, in order to produce the hydrocarbon-based ion conductor into a reinforced film form, an impregnation solution is prepared by dissolving the hydrocarbon-based ion conductor in a solvent, and then a method of immersing the porous support in the impregnation solution for a certain time period, or applying the impregnation solution on the surface of the porous support is used. However, in the case of the method described above, if the support has low impregnatability, or during the process of removing the solvent by evaporating the solvent after the impregnation or coating step described above, the affinity between the hydrocarbon-based ion conductor and the porous support may be decreased, and defects such as cavities may occur in the interior of the porous support. Then, due to the phenomenon in which the film of the relevant portion is pressed down by such cavities, cracking, membrane-electrode detachment, and the like may occur. Therefore, the impregnation or coating step is repeated several times, and accordingly, the thickness of the polymer electrolyte membrane is increased, while the thickness becomes non-uniform.

Furthermore, in the case of using a support with low porosity, there is a problem that the battery performance is deteriorated because the support itself serves as a resistance, and there occurs a problem of deterioration of the battery performance. In this regard, a reinforced membrane in which a support having a nanoweb structure with a maximized porosity has been proposed. However, despite its excellent performance and physical properties, such a reinforced membrane exhibits a reduction in performance under low-humidified operating conditions (less than 60%), rather than under high-humidified operating conditions (60% to 100%).

Therefore, there is a high demand for a technology that can realize minimization of the resistance and maximization of the battery performance at the time of production of a reinforced membrane containing a hydrocarbon-based ion conductor, by increasing the impregnatability of the hydrocarbon-based ion conductor into the porous support to the extent that does not affect the dimensional stability.

CITED REFERENCES (Patent Document 1) Korean Patent Application Publication No. 2006-0083374 (date of publication: Jul. 20, 2006)
(Patent Document 2) Korean Patent Application Publication No. 2006-0083372 (date of publication: Jul. 20, 2006)
(Patent Document 3) Korean Patent Application Publication No. 2011-0120185 (date of publication: Nov. 3, 2011)

SUMMARY OF THE INVENTION

An object of the present invention is to provide a polymer electrolyte membrane which has improved dimensional stability, membrane resistance and ion conductivity, and is capable of enhancing the performance even under low-humidified conditions when applied to a fuel cell.

Another object of the invention is to provide a method for producing the polymer electrolyte membrane described above.

Still another object of the invention is to provide a membrane electrode assembly including the polymer electrolyte membrane described above, and a fuel cell.

A polymer electrolyte membrane according to one aspect of the present invention includes a porous support including a web of nanofibers of a first hydrocarbon-based ion conductor that are arranged irregularly and discontinuously; and a second hydrocarbon-based ion conductor filling the pores of the porous support, while the first hydrocarbon-based ion conductor is a product obtained by eliminating at least a portion of the protective groups (Y) in a precursor of the first hydrocarbon-based ion conductor represented by the following Formula (1):

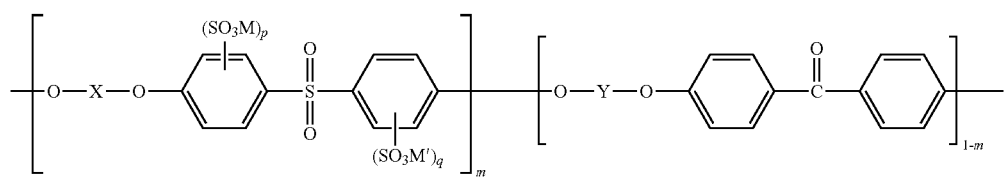

[Chemical Formula 1]

wherein in Formula (1),
m represents 0.01 to 0.1;
p and q each represent an integer from 0 to 4, while p and q are not zero (0) at the same time;
M and M' each independently represent any one selected from the group consisting of a hydrogen atom, a metal cation, and an ammonium cation;
X represents a divalent organic group represented by the following Formula (2); and
Y represents a protective group which is a divalent organic group represented by the following Formula (3):

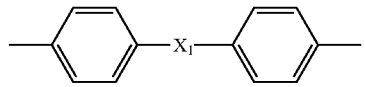

[Chemical Formula 2]

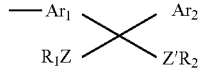

[Chemical Formula 3]

wherein in Formulas (2) and (3),
$Ar_1$ and $Ar_2$ each independently represent an arylene group having 6 to 18 carbon atoms;
$R_1$ and $R_2$ each independently represent a hydrogen atom or an alkyl group having 1 to 5 carbon atoms, or $R_1$ and $R_2$ are bonded to each other and form a heterocyclic ring together with Z and Z';
$X_1$ represents a single bond, or represents any one selected from the group consisting of an alkylene group having 1 to 5 carbon atoms and a fluoroalkylene group having 1 to 5 carbon atoms; and
Z and Z' each independently represent an oxygen atom or a sulfur atom.

In the above Formula (1), X may be any one selected from the group consisting of functional groups represented by the following Formulas (2a) to (2c).

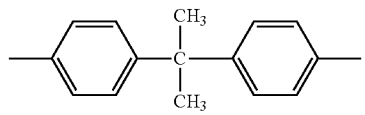

(2a)

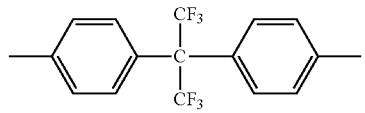

(2b)

-continued

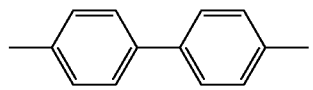

(2c)

Furthermore, in the above Formula (1), Y represents a functional group represented by the following Formula (3a):

[Chemical Formula 3a]

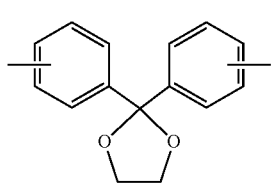

In the polymer electrolyte membrane described above, the first hydrocarbon-based ion conductor may be crystalline.

Furthermore, the first hydrocarbon-based ion conductor may have a degree of sulfonation of 1 mol % to 40 mol %.

The support may have a porosity of 80% to 95% by volume.

Also, the second hydrocarbon-based ion conductor may be a compound represented by the following Formula (4):

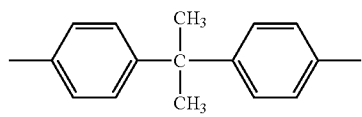
(2a)

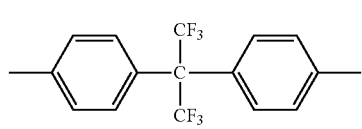
(2b)

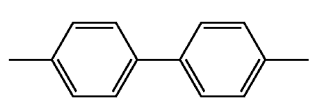
(2c)

[Chemical Formula 4]

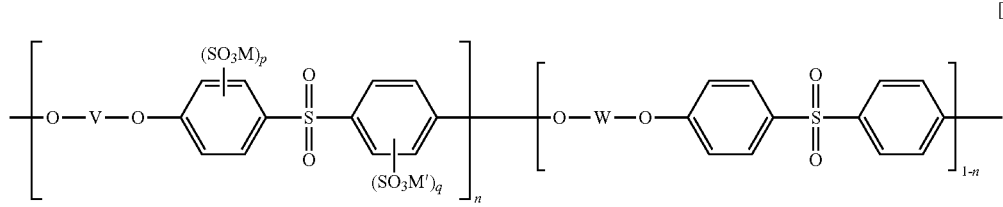

wherein in the Formula (4), n represents 0.01 to 0.1;

p and q each represent an integer from 0 to 4, while p and q are not zero (0) at the same time;

M and M' each independently represent any one selected from the group consisting of a hydrogen atom, a metal cation, and an ammonium cation; and V and W each independently represent a divalent organic group represented by the following Formula (5):

[Chemical Formula 5]

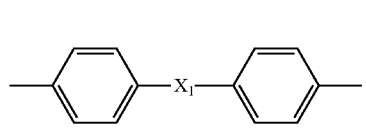

wherein $X_1$ represents a single bond, or represents any one selected from the group consisting of an alkylene group having 1 to 5 carbon atoms and a fluoroalkylene group having 1 to 5 carbon atoms.

In the above Formula (4), V and W each independently represent any one selected from the group consisting of functional groups represented by the following Formulas (2a) to (2c):

Furthermore, in the polymer electrolyte membrane, the second hydrocarbon ion conductor may be included in an amount of 50% to 99% by weight of the total weight of the polymer electrolyte membrane.

A method for producing a polymer electrolyte membrane according to another aspect of the present invention includes a step of electric spinning a precursor of a first hydrocarbon-based ion conductor represented by the following Formula (1), subsequently heat treating the precursor, and thereby producing a web of nanofibers containing the precursor of the first hydrocarbon-based ion conductor; a step of eliminating the protective groups in the first hydrocarbon-based ion conductor, and producing a porous support including the wet of nanofibers containing the first hydrocarbon-based ion conductor; and a step of filling the pores included in the porous support with a second hydrocarbon-based ion conductor:

[Chemical Formula 1]

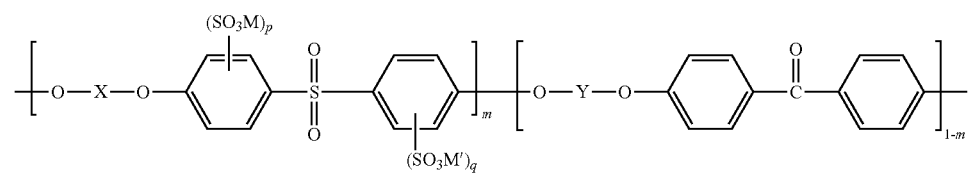

wherein in Formula (1), m represents 0.01 to 0.1;

p and q each represent an integer from 0 to 4, while p and q are not zero (0) at the same time;

M and M' each independently represent any one selected from the group consisting of a hydrogen atom, a metal cation, and an ammonium cation;

X represents a divalent organic group represented by the following Formula (2); and Y represents a protective group which is a divalent organic group represented by the following Formula (3):

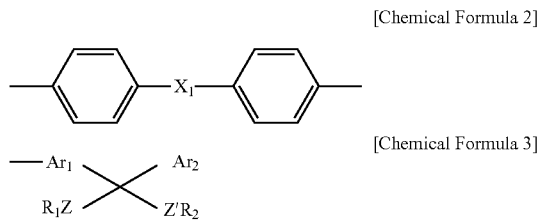

[Chemical Formula 2]

[Chemical Formula 3]

wherein in Formulas (2) and (3), $Ar_1$ and $Ar_2$ each independently represent an arylene group having 6 to 18 carbon atoms;

$R_1$ and $R_2$ each independently represent a hydrogen atom or an alkyl group having 1 to 5 carbon atoms, or $R_1$ and $R_2$ are bonded to each other and form a heterocyclic ring together with Z and Z';

$X_1$ represents a single bond, or any one selected from the group consisting of an alkylene group having 1 to 5 carbon atoms and a fluoroalkylene group having 1 to 5 carbon atoms; and Z and Z' each independently represent an oxygen atom or a sulfur atom.

In regard to the production method described above, the second hydrocarbon-based ion conductor may be a compound represented by the following Formula (4):

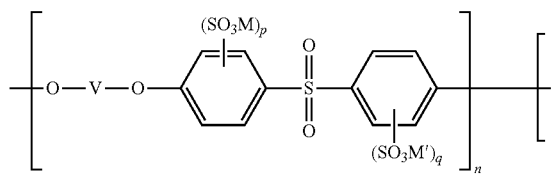

[Chemical Formula 4]

wherein in Formula (4), n represents 0.01 to 0.1;

p and q each represent an integer from 0 to 4, while p and q are not zero (0) at the same time;

M and M' each independently represent any one selected from the group consisting of a hydrogen atom, a metal cation, and an ammonium cation; and V and W each independently represent a divalent organic group represented by the following Formula (5):

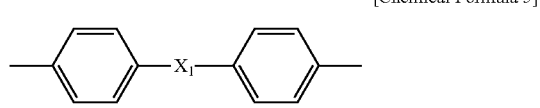

[Chemical Formula 5]

wherein $X_1$ represents a single bond, or represents any one selected from the group consisting of an alkylene group having 1 to 5 carbon atoms and a fluoroalkylene group having 1 to 5 carbon atoms.

The elimination of the protective groups may be carried out by acid-treating the web of nanofibers containing the precursor of the first hydrocarbon-based ion conductor.

A membrane electrode assembly according to another aspect of the present invention is a membrane electrode assembly including an anode electrode and a cathode electrode that are disposed to face each other, and the aforementioned polymer electrolyte membrane disposed between the anode electrode and the cathode electrode.

A fuel cell according to still another aspect of the present invention includes the membrane electrode assembly described above.

The polymer electrolyte membrane of the present invention has improved dimensional stability due to a hydrophobic support included therein, and exhibits improved mechanical properties even after the polymer electrolyte membrane has absorbed moisture. Since the membrane resistance is decreased, the membrane thickness can be minimized, and a hydrocarbon-based ion conductor uniformly and compactly fills the interior of a porous support so that ion conductivity and bondability are improved. Thus, the battery performance can be enhanced even under low-humidified conditions.

BRIEF DESCRIPTION OF THE DRAWINGS

FIG. 1 is a cross-sectional diagram schematically illustrating a membrane electrode assembly according to an embodiment of the present invention.

DETAILED DESCRIPTION OF THE INVENTION

Hereinafter, embodiments of the present invention will be described in detail so that those having ordinary skill in the art to which the present invention is pertained can easily carry out the invention. However, the present invention can be realized in various different forms, and is not intended to be limited to the embodiments described herein.

The term "nano" as used in the present specification means a nanoscale, and includes a size of 1 μm or less.

The term "diameter" as used in the present specification means the length of the shorter axis that passes through the center of a fiber, and the "length" means the length of the longer axis that passes through the center of a fiber.

At the time of producing a polymer electrolyte membrane as a reinforced composite membrane, when a support having a nanoweb structure is produced through electric spinning of a hydrocarbon-based ion conductor using a polyether ketone-based crystalline polymer, and then a reinforced composite membrane is produced by impregnating the support with an ion conductor having a polymer of the same structure incorporated therein, electrical conductivity is increased as ion conductivity is imparted, and chemical bondability are improved as a result of the use of a polymer of the same kind as that of the support. Thus, performance enhancement, particularly performance enhancement of the battery even under low-humidified conditions, can be expected. However, polyether ketone-based crystalline polymers are insoluble in organic solvents, and thus electric spinning is difficult. Also, when a support is produced using an ion conductor which is soluble in an organic solvent, the support is dissolved in the ion conductor solution at the time of impregnation, and thus it is impossible to produce a reinforced membrane.

In this regard, the present invention is characterized in that a support is produced by electric spinning a polyether ketone-based polymer which has protective groups so as to enable the polymer to be dissolved in an organic solvent, subsequently eliminating the protective groups through post-treatments, and thereby producing a support of a crystalline polyether ketone polymer which exhibits insolubility in an organic solvent, and thus, improved dimensional stability as well as enhanced mechanical properties can be exhibited even after the support has absorbed moisture, the membrane thickness can be minimized as a result of a reduction in the membrane resistance, and since the porous support is uniformly and compactly impregnated in the inner part with an ion conductor, ion conductivity and bondability are improved, so that improved battery performance is exhibited even under low-humidified conditions.

That is, the polymer electrolyte membrane according to an embodiment of the present invention includes a porous support including a web of nanofibers of a first hydrocarbon-based ion conductor that are arranged irregularly and discontinuously; and a second hydrocarbon-based ion conductor filling the pores of the porous support.

In the polymer electrolyte membrane described above, the porous support is a member playing the role of increasing the mechanical strength of the polymer electrolyte membrane and increasing dimensional stability by suppressing volumetric expansion caused by moisture. The support can be produced by electric spinning a solution containing a precursor of a first hydrocarbon-based ion conductor represented by the following Formula (1), thereby producing a nanofiber web of the polymer precursor, and eliminating at least a portion, and preferably the entirety, of the protective groups (Y) in the precursor molecules of the nanofiber web thus produced. That is, the porous support includes a web of polymer nanofibers that are three-dimensionally arranged irregularly and discontinuously by electric spinning, and the polymer nanofibers that constitute the web contains a first hydrocarbon-based ion conductor represented by the following Formula (1) in which at least a portion of the protective groups (Y) in the precursor of the first hydrocarbon-based ion conductor have been eliminated:

On the other hand, in Formula (1), X may be a divalent organic group represented by the following Formula (2):

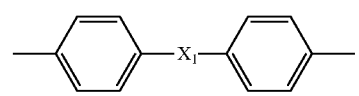

[Chemical Formula 2]

In the above Formula (2), X1 may be a single bond, or may be any one selected from the group consisting of an alkylene group having 1 to 5 carbon atoms and a fluoroalkylene group having 1 to 5 carbon atoms.

Preferably, from the viewpoint of improving the effects of the polymer electrolyte membrane according to the invention, X may be any one of functional groups represented by the following Formulas (2a) to (2c):

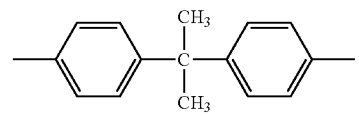

(2a)

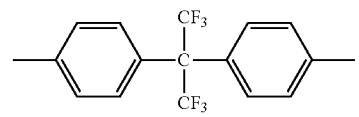

(2b)

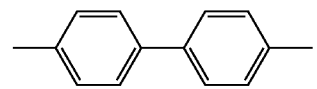

(2c)

Furthermore, in Formula (1), Y represents a protective group, and may be a divalent organic group represented by the following Formula (3):

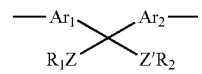

[Chemical Formula 3]

[Chemical Formula 1]

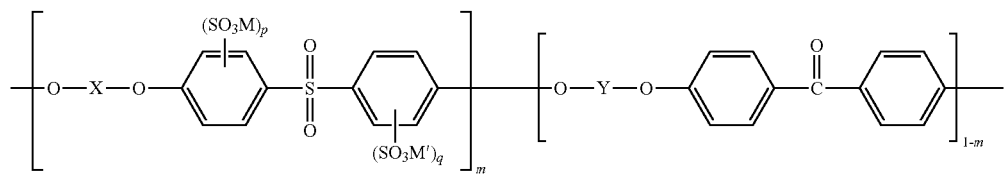

In the above Formula (1), m may be 0.01 to 0.1.

Furthermore, in the above Formula (1), —$(SO_3M)p$ and —$(SO_3M')q$ each represent an ionic group, and p and q may be each an integer from 0 to 4, while p and q are not zero (0) at the same time.

M and M' can be each independently selected from the group consisting of a hydrogen atom, a metal cation, and an ammonium cation, and M and M' may be preferably hydrogen atoms.

In the above Formula (3), $Ar_1$ and $Ar_2$ may each represent an arylene group having 6 to 18 carbon atoms.

Specific examples thereof include a phenylene group, a naphthalene group, and a biphenylene group, and among them, a phenylene group is preferred.

Furthermore, in the above Formula (3), R1 and R2 may each independently represent a hydrogen atom or an alkyl group having 1 to 5 carbon atoms, or may be bonded to each other and form a heterocyclic ring together with Z and Z'.

In Formula (3), Z and Z' may each independently represent an oxygen atom or a sulfur atom, and among them, an oxygen atom is preferred.

Preferably, in the above Formula (1), Y may be a divalent organic group represented by the following Formula (3a):

[Chemical Formula 3a]

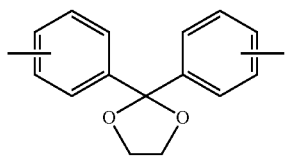

A precursor of a first hydrocarbon-based ion conductor having a structure such as described above exhibits solubility in conventional organic solvents such as dimethylacetamide (DMAc), dimethylformamide (DMF), and N-methyl-2-pyrrolidone (NMP); however, the precursor exhibits crystallinity when Y in the above Formula (1) is eliminated later by an acid treatment process, and exhibits insolubility in the organic solvents mentioned above. Consequently, the porous support containing the first hydrocarbon-based ion conductor is insoluble in conventional organic solvents, and therefore, the porous support exhibits excellent chemical resistance as well as hydrophobicity so that there is no risk of deformation caused by moisture in a highly humid environment.

The precursor of Formula (1) may be a block copolymer or a random copolymer.

The precursor of the first hydrocarbon-based ion conductor represented by Formula (1) can be produced by an aromatic nucleophilic substitution reaction between an aromatic active dihalide compound and a divalent phenol compound, or by an aromatic nucleophilic substitution reaction of a halogenated aromatic phenol compound, as in the case of conventional production methods for polymers.

For example, a random copolymer of a first hydrocarbon-based ion conductor represented by the following Formula (4) can be produced by subjecting 3,3-disulfonated-4,4-dichlorodiphenylsulfone (SDCDS), 4,4-dichlorodiphenyl ketone (DCDPS), and phenol, 4,4-(1,3-dioxolan-2-ylidene) bis- to a polymerization reaction.

On the other hand, in the case of a block copolymer, the copolymer can be produced by producing a first polymer by performing a polymerization reaction of SDCDS (3,3-disulfonated-4,4-dichlorodiphenylsulfone), producing a second polymer by subjecting DCDPS (4,4-dichlorodiphenyl ketone) and phenol, 4,4-(1,3-dioxolan-2-ylidene)bis- to a polymerization reaction, and then subjecting the first and second polymers thus produced to a polymerization reaction.

At this time, it is preferable that the reactions be carried out in the presence of basic compounds. Specific examples of the basic compounds include sodium hydroxide, potassium hydroxide, sodium carbonate, potassium carbonate, and sodium hydrogen carbonate, and these may be used singly or as mixtures of two or more kinds thereof.

Furthermore, the reactions may be carried out in solvents, and in this case, specific examples of the solvents include aprotic polar solvents such as N,N-dimethylacetamide, N,N-dimethylformamide, N-methyl-2-pyrrolidone, dimethyl sulfoxide, sulfolane, and 1,3-dimethyl-2-imidazolidinone. These solvents may be used singly or as mixtures of two or more kinds thereof.

Specifically, he first hydrocarbon-based ion conductor formed by deprotection of the precursor of Formula (1) such as described above may have a degree of sulfonation of 1 mol % to 40 mol %, and preferably 5 mol % to 40 mol %. When the first hydrocarbon-based ion conductor has a degree of sulfonation in the range described above, the ion conductor may exhibit excellent ion conductivity without a decrease in dimensional stability.

Also, in order for the porous support to have an optimized porosity and an optimized thickness as a result of being produced from nanofibers having an optimized diameter, and in order to facilitate the production of a porous support having excellent mechanical properties even after the support has absorbed moisture, it is preferable that the first hydrocarbon-based ion conductor have a weight average molecular weight of 30,000 to 500,000 g/mol. If the weight average molecular weight of the first hydrocarbon-based ion conductor is less than 30,000 g/mol, the porosity and thickness of the porous support can be controlled easily; however, the porosity and the mechanical properties after moisture absorption may be deteriorated. On the other hand, if the weight average molecular weight of the first hydrocarbon-based ion conductor is more than 500,000 g/mol, the production process may not be carried out smoothly, and the porosity may be decreased.

The porous support according to the invention includes a web of nanofibers containing the first hydrocarbon-based ion conductor such as described above, and the web of nanofibers is an aggregate of polymer nanofibers in which nanofibers produced by electric spinning are three-dimensionally arranged irregularly and discontinuously.

Specifically, in consideration of the porosity and thickness of the porous support, it may be preferable that the nanofibers have an average diameter of 0.01 to 5 μm when the fiber diameters of 50 fibers are measured using a scanning electron microscope (JSM6700F, JEOL, Ltd.), and the average diameter is calculated from the measured values. If the average diameter of the nanofibers is less than 0.01 μm, the mechanical strength of the porous support may be decreased, and if the average diameter of the nanofibers is more than 5 μm, the porosity may be decreased, and the thickness may increase.

Furthermore, the porous support may contain a large number of uniformly distributed pores, since nanofibers having diameters such as described above are arranged arbitrarily.

The porous support containing a large number of uniformly distributed pores as such has an excellent porosity and characteristics that can complement the physical properties of the ion conductor (dimensional stability and the like). Specifically, the pore diameter, which is the diameter of the pores formed in the porous support, may be formed in the range of 0.05 to 30 μm. However, if the pore diameter is formed to have a value of less than 0.05 μm, the ion conductivity of the polymer electrolyte membrane may be decreased, and if the pore diameter is more than 30 μm, the mechanical strength of the polymer electrolyte membrane may be decreased.

Furthermore, the porosity that indicates the degree of formation of pores in the porous support may be 80% to 95%. When the porous support has such a high porosity, the specific surface area of the porous support becomes large. Therefore, impregnation of the support with the second hydrocarbon-based ion conductor is made easier, and consequently, the porous support may exhibit excellent ion conductivity. If the porosity of the porous support is less than 80%, sufficient ion conductivity may not be easily obtained, and if the porosity of the porous support is more than 95%, the mechanical strength and morphological stability may be decreased.

The porosity (%) can be calculated by the following Mathematical Formula (1), based on the ratio of the air volume to the total volume of the porous support:

Porosity (%)=(Air volume/total volume)×100   [Mathematical Formula 1]

Here, the total volume of the porous support can be obtained by producing a sample of a porous support having a rectangular shape, measuring the width, length and thickness, and calculating the volume. The air volume of the porous support can be obtained by measuring the mass of the porous support sample, and then subtracting the polymer volume calculated back from the density, from the total volume of the porous support.

Furthermore, the porous support may have an average thickness of 5 to 50 μm. If the thickness of the porous support is less than 5 μm, there is a risk that the mechanical strength and dimensional stability of the polymer electrolyte membrane may be decreased, and if the thickness is more than 50 μm, the ohmic loss may increase, and weight reduction and integration may be difficult. A more preferred thickness of the porous support is in the range of 10 to 30 μm.

On the other hand, the porous support has its pores filled with a second hydrocarbon-based ion conductor.

The second hydrocarbon-based ion conductor is to carry out the proton conduction function, which is a main function of the polymer electrolyte membrane, and for this ion conductor, a hydrocarbon-based polymer which has excellent proton conduction function and is advantageous in terms of price can be used. Particularly, when the ease of the filling process of filling the pores of the porous support with an ion conductor is considered, it may be preferable to use a hydrocarbon-based polymer which is soluble in organic solvents. Regarding the hydrocarbon-based polymer that is soluble in organic solvents, a sulfonated polyimide (S-PI), a sulfonated polyaryl ether sulfone (S-PAES), a sulfonated polyether ether ketone (SPEEK), a sulfonated polybenzimidazole (SPBI), a sulfonated polysulfone (S-PSU), a sulfonated polystyrene (S-PS), a sulfonated polyphosphazene), a mixture thereof, or the like can be used, but the hydrocarbon-based polymer is not limited to these. Here, the term "soluble" in organic solvents means the characteristic of being dissolvable at normal temperature.

Preferably, the ion conductor may be a second hydrocarbon-based ion conductor represented by the following Formula (4):

[Chemical Formula 5]

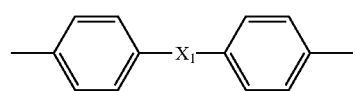

wherein in Formula (5), $X_1$ has the same meaning as defined above.

The second hydrocarbon-based ion conductor such as described above may be included in an amount of 50% to 99% by weight relative to the total weight of the polymer electrolyte membrane. If the content of the ion conductor is less than 50% by weight, there is a risk that the proton conductivity of the polymer electrolyte membrane may be decreased, and if the content of the ion conductor is more than 99% by weight, the mechanical strength and dimensional stability of the polymer electrolyte membrane may be decreased.

In general, when the operating conditions such as temperature or humidity are changed during the operation of a fuel cell, the adhesiveness between the ion conductor and the porous support may be deteriorated. However, the polymer electrolyte membrane according to the invention is configured such that the ion conductor and the porous support both include hydrocarbon-based polymers, and the first hydrocarbon-based ion conductor used in the support has a structure that is identical with at least a portion of the hydrophilic and hydrophobic moieties in the second hydrocarbon-based ion conductor used for impregnation. Therefore, the compatibility and adhesiveness between the support and the impregnating polymer are high. Also, since the first hydrocarbon-based ion conductor that is used as the support is imparted with ion conductivity, the polymer electrolyte membrane thus produced has reduced resistance of the support, and exhibits improved ion conductivity.

Furthermore, regarding the polymer electrolyte membrane according to the invention, since the second hydrocarbon-based ion conductor uniformly and compactly fills the interior of a highly porous support, the polymer electrolyte membrane exhibits excellent mechanical strength, specifically an excellent mechanical strength of 10 MPa or more, together with high ion conductivity. As such, as the ion conductivity and mechanical strength are increased, the overall thickness of the polymer electrolyte membrane can be decreased, and specifically, the thickness can be decreased to 80 μm or less. As a result, the rate of proton conduction is increased while the material cost is reduced, and the ohmic loss is decreased.

[Chemical Formula 4]

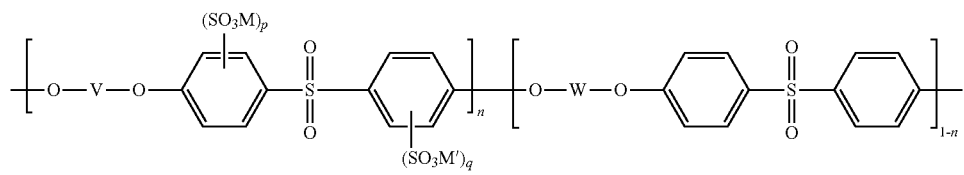

wherein in Formula (4), M, M', p and q respectively have the same meanings as defined above.

n may be 0.01 to 0.1.

Furthermore, V and W may each independently represent a divalent organic group represented by the following Formula (5):

Furthermore, since the polymer electrolyte membrane according to the invention includes a hydrophobic support, the polymer electrolyte membrane can exhibit excellent dimensional stability. Specifically, the polymer electrolyte membrane exhibits an excellent dimensional stability of 8% or less, and preferably 1% or less, when the membrane is swollen with water. The dimensional stability is a physical property that is evaluated according to the following Mathematical Formula (2) from the change in length before and after swelling when a reinforced composite membrane is swollen with water:

Dimensional stability=[(Length after swelling−length before swelling)/length before swelling]×100     [Mathematical Formula 2]

According to another embodiment of the present invention, there is provided a method for producing a polymer electrolyte membrane, the method including a step of electric spinning a precursor of a first hydrocarbon-based ion conductor represented by the above Formula (1), and producing a web of nanofibers containing the precursor of the first hydrocarbon-based ion conductor (Step 1); a step of eliminating the protective groups in the first hydrocarbon-based ion conductor, and producing a porous support containing the first hydrocarbon-based ion conductor (Step 2); and a step of filling the pores contained in the porous support with a second hydrocarbon-based ion conductor (Step 3).

The various steps will be described below. Step 1 is a step of electric spinning a precursor solution containing a precursor of a first hydrocarbon-based ion conductor and producing a nanofiber web of the polymer precursor (hereinafter, referred to as "web precursor").

The precursor of the first hydrocarbon-based ion conductor contains protective groups in the molecule, and thereby exhibits solubility in organic solvents. However, when the precursor is deprotected by a subsequent acid treatment, the precursor exhibits crystallinity and becomes insoluble in organic solvents. The precursor of the first hydrocarbon-based ion conductor has the structure of Formula (1) as explained above.

Since the precursor of the first hydrocarbon-based ion conductor exhibits solubility in organic solvents, the precursor can be used in the form of a solution having the precursor dissolved in a solvent for electric spinning.

Specific examples of the solvent that may be used in this case include aprotic polar solvents such as N,N'-dimethylacetamide, N,N'-dimethylformamide, N-methyl-2-pyrrolidone, dimethyl sulfoxide, sulfolane, 1,3-dimethyl-2-imidazolidinone, and hexamethylphosphone triamide; ester-based solvents such as γ-butyrolactone and butyl acetate; carbonate-based solvents such as ethylene carbonate and propylene carbonate; alkylene glycol monoalkyl ethers such as ethylene glycol monomethyl ether, ethylene glycol monoethyl ether, propylene glycol monomethyl ether, and propylene glycol monoethyl ether; alcohol-based solvents such as isopropanol; water; and mixtures thereof. Among them, aprotic polar solvents have the highest solubility and are preferred.

In this case, it is preferable that the precursor be included in the precursor solution at a concentration of 5% to 20% by weight relative to the total weight of the precursor solution. If the concentration of the precursor solution is less than 5% by weight, spinning does not proceed smoothly, and therefore, fiber formation may not be achieved, or fibers having a uniform diameter cannot be produced. On the other hand, if the concentration of the precursor solution is more than 20% by weight, spinning may not be achieved as the discharge pressure increases rapidly, or processability may be deteriorated.

The electric spinning process for the precursor solution thus produced may be carried out according to a conventional electric spinning process.

Specifically, a nanofiber web can be produced by supplying the precursor solution in a constant amount using a quantitative pump from a solution tank for storing the precursor solution to a spinning unit, discharging the precursor solution through a nozzle of the spinning unit, subsequently forming nanofiber precursors that have been solidified simultaneously with scattering, additionally collecting and then heat treating these solidified nanofiber precursors on a collector having a releasing film.

At this time, the intensity of the electric field between the spinning unit and the collector applied by a high voltage generating unit is preferably 850 to 3,500 V/cm. If the intensity of the electric field is less than 850 V/cm, the precursor solution is not discharged continuously, and therefore, it is difficult to produce nanofibers having a uniform thickness. Also, since the nanofibers formed after spinning cannot be smoothly collected on the collector, production of the nanofiber web may be difficult. On the other hand, if the intensity of the electric field is more than 3,500 V/cm, because the nanofibers are not accurately set on the collector, a nanofiber web having a normal form cannot be obtained.

Thus, nanofiber precursors having a uniform fiber diameter, preferably an average diameter of 0.01 to 5 μm, are produced through a spinning process such as described above, and the nanofiber precursors are randomly arranged to form a fiber aggregate.

Subsequently, the nanofiber aggregate is heat treated, and thereby a web of nanofibers is produced.

At this time, the heat treatment may be carried out at 100° C. to 250° C., and preferably at 120° C. to 150° C. The heat treatment time may vary with the heat treatment temperature, and specifically, the heat treatment can be carried out for 1 minute to 1 hour.

Through such a heat treatment, the organic solvent included in the nanofibers can be volatilized, the mechanical properties such as elastic modulus and fracture strength of the polymer electrolyte membrane are enhanced, and the fuel permeability of hydrogen, methanol or the like can be decreased.

Also, if necessary, the polymer structure may also be crosslinked by a means such as irradiation, such as irradiation with an electron beam or irradiation with active radiation.

As such, by crosslinking the polymer electrolyte membrane, fuel blockability, the effect of suppressing the swelling against fuel, and the mechanical strength can be enhanced.

Step 2 is a step of eliminating the protective groups in the first hydrocarbon-based ion conductor in the nanofiber web, and thereby producing a porous support containing the first hydrocarbon-based ion conductor.

The elimination of the protective groups may be carried out by an acid treatment.

Specifically, the first hydrocarbon-based ion conductor can be deprotected by immersing the nanofiber web in an aqueous solution of an acid catalyst.

At this time, examples of the acid catalyst include strong inorganic acids such as hydrochloric acid, nitric acid, fluorosulfonic acid, and sulfuric acid; and strong organic acids such as p-toluenesulfonic acid and trifluoromethanesulfonic acid. The kind and amount of the acid catalyst, the reaction pressure, and the like may be appropriately selected in accordance with the thickness of the polymer electrolyte membrane and the like. Specifically, it is preferable to use the acid catalyst at a concentration of 0.1 to 50% by weight of the amount of available water.

Step 3 is a step of filling a second hydrocarbon-based ion conductor into the pores contained in the porous support produced in Step 1 as described above.

Regarding the method of filling the second hydrocarbon-based ion conductor, a method of immersing the porous support in an ion conductor solution prepared by dissolving the second hydrocarbon-based ion conductor in a solvent, or a method of applying the ion conductor solution on the porous support using various coating methods that are known in the art, such as a spraying process, a screen printing process, and a doctor blade process, can be utilized. In the case of using the immersion process, it is preferable to perform the immersion process 2 to 5 times at normal temperature for 5 to 30 minutes.

The ion conductor solution can be prepared by dissolving the second hydrocarbon-based ion conductor in an organic solvent. For the organic solvent, N-methyl-2-pyrrolidone (NMP), dimethylformamide (DMF), or dimethylacetamide (DMA) can be used, but the invention is not intended to be limited to these.

The details of the second hydrocarbon-based ion conductor are the same as explained above.

It is preferable that the amount of the second hydrocarbon-based ion conductor be appropriately determined in consideration of the content of the ion conductor incorporated in the reinforced composite membrane. Specifically, the second hydrocarbon-based ion conductor may be included at a proportion of 5% to 40% by weight in the ion conductor solution. If the second hydrocarbon-based ion conductor is included in an amount of less than 5% by weight, empty spaces may be formed because the second hydrocarbon-based ion conductor does not sufficiently fill in the pores of the porous support. If the second hydrocarbon-based ion conductor is included in an amount of more than 40% by weight, the viscosity of the ion conductor solution becomes so high that the second hydrocarbon-based ion conductor may not be able to penetrate into the pores of the porous support.

After the pores are filled with the ion conductor solution, the organic solvent of the ion conductor solution is removed, and thereby the pores of the porous support are filled with the ion conductor. Therefore, the method for producing a polymer electrolyte membrane according to the invention may further include a step of removing the organic solvent after filling of the second hydrocarbon-based ion conductor, and the organic solvent removal step can be carried out by a process of drying the porous support in a vacuum oven at 60° C. to 150° C. for 2 to 15 hours.

The polymer electrolyte membrane produced by the production method such as described above has improved ion conductivity and impregnability because the support is produced using a hydrocarbon-based ion conductor having a structure which contains both a hydrophilic moiety and a hydrophobic moiety, and consequently, the polymer electrolyte membrane can exhibit markedly enhanced performance when applied to a fuel cell even at the time of operation under low-humidified conditions, as compared with the conventional polymer electrolyte membranes of non-ion-conductive hydrophobic hydrocarbon-based polymers.

Therefore, according to another embodiment of the present invention, there are provided a membrane electrode assembly for a fuel cell, which includes the polymer electrolyte membrane described above, and a fuel cell.

Specifically, the membrane electrode assembly includes an anode electrode and a cathode electrode that are arranged to face each other, and the aforementioned polymer electrolyte membrane interposed between the anode electrode and the cathode electrode.

FIG. 1 is a cross-sectional diagram schematically illustrating the membrane electrode assembly according to an embodiment of the invention. According to FIG. 1, the membrane electrode assembly (100) according to an embodiment of the invention includes a polymer electrolyte membrane (50) and electrodes for a fuel cell (20, 20') that are respectively disposed on the two surfaces of the polymer electrolyte membrane (50). Each of the electrodes includes an electrode substrate (40, 40') and a catalyst layer (30, 30') formed on the surface of the electrode substrate, and may further include, between the electrode substrate (40, 40') and the catalyst layer (30, 30'), fine pore layers (not shown in the diagram) containing conductive fine particles of carbon powder or carbon black in order to facilitate the material diffusion in the electrode substrate.

In the membrane electrode assembly (100), the electrode (20) that is disposed on one surface of the polymer electrolyte membrane (50) and causes an oxidation reaction of producing protons and electrons from the fuel delivered through the electrode substrate (40) to the catalyst layer (30) is called an anode electrode (or an oxidation electrode), and the electrode (20') that is disposed on the other surface of the polymer electrolyte membrane (50) and causes a reduction reaction of producing water from the protons supplied thereto through the polymer electrolyte membrane (50) and an oxidant delivered through the electrode substrate (40') to the catalyst layer (30') is called a cathode electrode (or a reduction electrode).

The catalyst layers (30, 30') of the anode and cathode electrodes (20, 20') contain a catalyst. Regarding the catalyst, any material that can participate in the reaction of the battery and can be used as a catalyst for a conventional fuel cell, can be used. Specifically, a platinum-based catalyst can be used, and regarding the platinum-based catalyst, one or more catalysts selected from platinum, ruthenium, osmium, a platinum-ruthenium alloy, a platinum-osmium alloy, a platinum-palladium alloy, or a platinum-M alloy (wherein M represents one or more transition metals selected from the group consisting of gallium (Ga), titanium (Ti), vanadium (V), chromium (Cr), manganese (Mn), iron (Fe), cobalt (Co), nickel (Ni), copper (Cu), zinc (Zn), tin (Sn), molybdenum (Mo), tungsten (W) and rhodium (Rh)) can be used. Specifically, one or more selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W can be used. These catalysts may be used by catalyst themselves (black), or can be used in the form of being supported on a carrier. Examples of this carrier that can be used include carbon-based materials such as graphite, Denka black, Ketjen black, acetylene black, carbon nanotubes, carbon nanofibers, carbon nanowires, carbon nanoballs, and activated carbon; and inorganic microparticles of alumina, silica, zirconia and titania.

Furthermore, the catalyst layers (30, 30') may further include a binder resin for the purposes of increasing the adhesive power between the catalyst layer and the polymer electrolyte membrane and effectively delivering protons. Regarding the binder resin, the same resin as the ion conductor used at the time of producing the reinforced composite membrane can be used.

Regarding the electrode substrates (40, 40'), a porous conductive substrate can be used so that smooth supply of hydrogen or oxygen can be achieved. Representative examples thereof that can be used include carbon paper, carbon cloth, carbon felt, and metal cloth (this refers to a product in which a metal film has been formed on the surface of a porous film constituted of a metal cloth in a fibrous state or on the surface of a cloth formed from polymer fibers), but the invention is not limited to these. Furthermore, for the electrode substrate, it is preferable to use a substrate that has been water-repellent treated with a fluororesin, because the occurrence of a decrease in the reactant diffusion efficiency caused by water generated at the time of driving of the fuel cell can be prevented. Examples of the fluororesin that can be used include polytetrafluoroethylene, polyvinylidene fluoride, polyhexafluoropropylene, polyperfluoroalkyl vinyl ether, polyperfluorosulfonyl fluoride alkoxyvinyl ether, fluorinated ethylene-propylene, and polychlorotrifluoroethylene, and copolymers thereof.

The membrane electrode assembly can be produced according to a conventional production method for a membrane electrode assembly for a fuel cell, except that the polymer electrolyte membrane described above is used as the polymer electrolyte membrane.

The fuel cell according to still another embodiment of the present invention provides a fuel cell including the membrane electrode assembly described above.

Specifically, the fuel cell includes at least one electricity generating unit that generates electricity through an oxidation reaction of fuel and a reduction reaction of an oxidant; a fuel supply unit that supplies fuel to the electricity generating unit; and an oxidant supply unit that supplies an oxidant such as oxygen or air to the electricity generating unit, the electricity generating unit including the membrane electrode assembly and a separator for supplying the fuel and the oxidant to both sides of the membrane electrode assembly. In this invention, hydrogen or a hydrocarbon fuel in the state of gas or liquid can be used, and representative examples of the hydrocarbon fuel include methanol, ethanol, propanol, butanol, and natural gas.

In regard to the fuel cell, the separator that constitutes the electricity generating unit, the fuel supply unit and the oxidant supply unit are the same as those used in conventional fuel cells, except that the membrane electrode assembly according to an embodiment of the invention is used. Therefore, detailed explanation on the units will not be given in the present specification.

EXAMPLES

Hereinafter, Examples of the present invention will be described in detail so that those having ordinary skill in the art to which the present invention is pertained can easily carry out the invention. However, the present invention can be realized in various different forms, and is not intended to be limited to the Examples described herein.

Materials used in the following Comparative Examples and Examples are as follows.

Production Example 1: Sulfonated Polyarylene Ether Sulfone 4,4-Biphenol (BP) and $K_2CO_3$ were introduced together with N-methyl-2-pyrrolidone (NMP) and toluene into a four-necked round bottom flask equipped with a Dean-Stark trap, and while the mixture was stirred with a mechanical stirrer, the temperature was slowly increased to 150° C. over a period of about 2 hours. Toluene began to be refluxed at the temperature of 150° C. through the Dean-Stark trap, and thus toluene was removed by maintaining the refluxing condition for about 4 hours. Dried SDCDS (3,3-disulfonated-4,4-dichlorodiphenylsulfone) and DCDPS (4,4-dichlorodiphenylsulfone) were weighed in a glove box, and were introduced into the reactor together with NMP. The temperature was slowly increased to 195° C., and the system was stirred for 16 hours. After polymerized was completed, the product was immersed in water, and salts were removed at 100° C. for 2 hours. The filtrate obtained by filtering the resultant was dried, and thus sulfonated polyarylene ether sulfone was produced.

Production Example 2: Sulfonated Polyether Ether Ketone-Ether Sulfone Random Copolymer BP and $K_2CO_3$ were introduced together with NMP and toluene into a four-necked round bottom flask equipped with a Dean-Stark trap, and while the mixture was stirred with a mechanical stirrer, the temperature was slowly increased to 150° C. over a period of about 2 hours. Toluene began to be refluxed at the temperature of 150° C. through the Dean-Stark trap, and thus toluene was removed by maintaining the refluxing condition for about 4 hours. Dried SDCDS, DCDPS, and phenol,4,4-(1,3-dioxolan-2-ylidene)bis- (Cas No. 91998-26-4, manufactured by Yanjin Technology Co., Ltd.) were weighed in a glove box, and were introduced into the reactor together with NMP. The temperature was slowly increased to 195° C., and the system was stirred for 16 hours. After polymerized was completed, the product was immersed in water, and salts were removed at 100° C. for 2 hours. The filtrate obtained by filtering the resultant was dried, and thus a sulfonated polyether ether ketone-ether sulfone random copolymer was produced.

Production Example 3: Sulfonated Polyether Ether Ketone-Ether Sulfone Block Copolymer BP and $K_2CO_3$ were introduced together with NMP and toluene into a four-necked round bottom flask equipped with a Dean-Stark trap, and while the mixture was stirred with a mechanical stirrer, the temperature was slowly increased to 150° C. over a period of about 2 hours. Toluene began to be refluxed at the temperature of 150° C. through the Dean-Stark trap, and thus toluene was removed by maintaining the refluxing condition for about 4 hours. Dried SDCDS (3,3-disulfonated-4,4-dichlorodiphenylsulfone) was weighed in a glove box, and was introduced into the reactor together with NMP. The temperature was slowly increased to 195° C., and the system was stirred for 16 hours. After polymerized was completed, the product was immersed in water, and salts were removed at 100° C. for 2 hours. The filtrate obtained by filtering the resultant was dried, and thus a first polymer was produced.

Next, a second polymer was produced in the same manner as described above, except that DCDPS (4,4-dichlorodiphenyl ketone) and phenol, 4,4-(1,3-dioxolan-2-ylidene)bis- were used instead of SDCDS.

The first and second polymers produced as described above were introduced into a reactor together with NMP, and the temperature was slowly increased to 150° C. The system was stirred for 12 hours, and then the product was filtered. The filtrate thus obtained was dried. Thus, a sulfonated polyether ether ketone-ether sulfone block copolymer was obtained.

Comparative Example 1: Production of Polymer Electrolyte Membrane

Polyamic acid was dissolved in dimethylformamide, and thus 5 L of a spinning solution having a viscosity of 480 poise was prepared. At this time, $CsHSO_4$ was used in an amount that resulted in a final content of 5% by weight relative to the total weight of the porous support finally produced. The spinning solution thus prepared was transferred to a solution tank, and this spinning solution was supplied through a quantitative gear pump to a spinning chamber having 20 nozzles, to which a high voltage of 3 kV was applied, and was spun out. Thus, a web of nanofiber precursors was produced. The supply amount of the solution used at this time was 1.5 ml/min. The web of the nanofiber precursors thus produced was heat treated at 350° C., and thus a porous support (porosity: 90% by volume) was produced.

The porous support produced as described above was impregnated with an ion conductor solution that had been prepared by dissolving a 50 mol %-sulfonated polyarylene ether sulfone (S-PAES) produced in Production Example 1 in DMAc at a concentration of 20% by weight, and the impregnation process was carried out twice for 30 minutes. Subsequently, the porous support was left to stand for 1 hour under reduced pressure, and was dried in a vacuum at 80 mmHg for 10 hours. Thus, a polymer electrolyte membrane was produced. At this time, the weight per unit area of the polyimide nanofibers was 6.8 gsm, and the weight of the sulfonated polyarylene ether sulfone was 65 mg/cm$^2$.

Comparative Example 2: Production of Polymer Electrolyte Membrane

Production was carried out in the same manner as in Comparative Example 1, except that the 50 mol %-sulfonated polyarylene ether sulfone (S-PAES) produced in Production Example 1 was used instead of the polyamic acid used in Comparative Example 1.

However, the support dissolved in the organic solvent during the process of impregnating the support produced from S-PAES with S-PAES. Thus, it was impossible to produce a polymer electrolyte membrane.

Example 1: Production of Polymer Electrolyte Membrane

A nanoweb support (porosity: 90% by volume) was produced in the same manner as in Comparative Example 1, except that the 40 mol %-sulfonated polyether ether ketone-ether sulfone block copolymer produced in Production Example 3 was used. The support thus produced was impregnated with the 50 mol %-sulfonated polyarylene ether sulfone (S-PAES) produced in Production Example 1, and then the membrane thus obtained was immersed in 2 M sulfuric acid at 95° C. for 2 hours. Thus, a polymer electrolyte membrane was produced.

The density of sulfonic acid groups in the polymer electrolyte membrane thus obtained was 50 mmol/g, and the polymer electrolyte membrane had a membrane thickness of 25 μm and a proton conductivity per area A of 0.2 S/cm$^2$. Furthermore, there was hardly any dimensional change observed when the polymer electrolyte membrane was kept in an aqueous solution at 80° C.

Example 2: Production of Polymer Electrolyte Membrane

A nanoweb support (porosity: 90% by volume) was produced in the same manner as in Comparative Example 1, except that the 5 mol %-sulfonated polyether ether ketone-ether sulfone random copolymer produced in Production Example 2 was used. The nanoweb support produced in Production Example 1 was impregnated with the 50 mol %-sulfonated polyarylene ether sulfone (S-PAES) produced in Production Example 1, and then the membrane thus obtained was immersed in 2 M sulfuric acid at 95° C. for 2 hours. Thus, a polymer electrolyte membrane was produced.

The density of sulfonic acid groups in the polymer electrolyte membrane thus obtained was 50 mmol/g, and the polymer electrolyte membrane had a membrane thickness of 25 μm and a proton conductivity per area A of 0.2 S/cm$^2$. Furthermore, there was hardly any dimension change observed when the polymer electrolyte membrane was kept in an aqueous solution at 80° C.

Example 3: Production of Polymer Electrolyte Membrane

A nanoweb support (porosity: 90% by volume) was produced in the same manner as in Comparative Example 1, except that a 5 mol %-sulfonated polyether ether ketone-ether sulfone block copolymer produced in the same manner as in Production Example 3 was used. The support thus produced was impregnated with the 50 mol %-sulfonated polyarylene ether sulfone (S-PAES) produced in Production Example 1, and then the membrane thus obtained was immersed in 2 M sulfuric acid at 95° C. for 2 hours. Thus, a polymer electrolyte membrane was produced.

The density of sulfonic acid groups in the polymer electrolyte membrane thus obtained was 50 mmol/g, and the polymer electrolyte membrane had a membrane thickness of 25 μm and a proton conductivity per area A of 0.2 S/cm$^2$. Furthermore, there was hardly any dimension change observed when the polymer electrolyte membrane was kept in an aqueous solution at 80° C.

Example 4: Production of Membrane Electrode Assembly

A membrane electrode assembly was produced by forming an electrode layer using a decal method for the polymer electrolyte membrane produced in Example 1. At this time, regarding the catalyst layer of the electrodes, a catalyst layer was formed by applying a composition for forming a catalyst layer containing a Pt/carbon catalyst on a release film and drying the composition, and the release film coated with a catalyst layer was positioned on both surfaces of a reinforced composite membrane such that the catalyst layer faced the reinforced composite membrane. Subsequently, the assembly was hot pressed at a pressure of 200 kg/cm$^2$ and a temperature of 120° C., and thus the catalyst layer was transferred to the both surfaces of the reinforced composite membrane.

Subsequently, a gas diffusion layer (GDL) was formed on both surfaces of the reinforced composite membrane bonded with the catalyst layer, and thus a membrane electrode assembly was produced. The loading amount of the catalyst used in this case was 0.4 mg/cm$^2$.

Test Example

Physical properties of the polymer electrolyte membranes produced in Examples 1 to 3 and Comparative Examples 1 and 2 were evaluated. The results are presented in the following Table 1.

TABLE 1

|  | Conductivity (S/cm²) | | Cell performance (A/cm² @ 0.6 V) | |
|---|---|---|---|---|
|  | Humidity 50% | Humidity 100% | Humidity 50% | Humidity 100% |
| Comparative Example 1 | 0.02 | 0.200 | 0.4 | 1.0 |
| Comparative Example 2 |  | Not available | | |
| Example 1 | 0.035 | 0.3 | 0.6 | 1.4 |
| Example 2 | 0.025 | 0.25 | 0.5 | 1.2 |
| Example 3 | 0.03 | 0.25 | 0.6 | 1.2 |

As shown in the above Table 1, the polymer electrolyte membrane according to Example 1 had a low degree of improvement in dimensional stability due to high hydrophilicity of the support, but the polymer electrolyte membrane exhibited markedly enhanced results in terms of ion conductivity and performance. The polymer electrolyte membrane of Example 2 exhibited markedly improved results in terms of ion conductivity, dimensional stability and performance, as compared with Comparative Example 1. Furthermore, Example 3 had slightly lower ion conductivity than Example 1; however, the polymer electrolyte membrane exhibited more improved effects in terms of dimensional stability, and exhibited further improved performance under low-humidified conditions compared to Example 2.

From the results described above, it was confirmed that the polymer electrolyte membranes according to the invention have excellent ion conductivity, dimensional stability and performance, and a particularly excellent performance improving effect under low-humidified conditions.

Preferred embodiments of the present invention have been discussed in detail in the above; however, the scope of rights of the invention is not intended to be limited to these embodiments, and it should be construed that various modifications and improvements made by those skilled in the art by utilizing the fundamental concept of the invention are also included in the scope of rights of the invention.

LIST OF REFERENCE NUMERALS

- 100: Membrane electrode assembly
- 20, 20': Electrodes
- 30, 30: Catalyst layer
- 40, 40': Electrode substrate
- 50: Polymer electrolyte membrane

INDUSTRIAL APPLICABILITY

The present invention relates to a polymer electrolyte membrane, a method for producing the same, and a membrane electrode assembly including the same.

The polymer electrolyte membrane can be applied to fuel cells, and in this case, the polymer electrolyte membrane has improved dimensional stability due to the hydrophobic support, and exhibits improved mechanical properties upon moisture absorption. The membrane thickness can be minimized as the membrane resistance is decreased, ion conductivity and bondability are improved because the pores in the porous support are uniformly and compactly filled with a hydrocarbon-based ion conductor, and thus the performance of a fuel cell can be enhanced even under low-humidified conditions.

What is claimed is:

1. A method for producing a composite polymer electrolyte membrane, the method comprising:
    preparing a first solution by dissolving a precursor of a first hydrocarbon-based ion conductor in a first solvent, the first hydrocarbon-based ion conductor being a sulfonated polyether ketone-based crystalline polymer which is insoluble in the first solvent;
    producing a nanoweb structure by electric spinning and subsequently heat treating the first solution;
    eliminating protective groups from the precursor of the nanoweb structure, thereby converting the precursor into the first hydrocarbon-based ion conductor and producing a porous support of the nanoweb structure containing the first hydrocarbon-based ion conductor; and
    filling pores of the porous support with a second hydrocarbon-based ion conductor by (i) applying a second solution prepared by dissolving the second hydrocarbon-based ion conductor in a second solvent in which the first hydrocarbon-based ion conductor is insoluble to the porous support and (ii) removing the second solvent.

2. The method according to claim 1, wherein the second hydrocarbon-based ion conductor is a compound of the following Chemical Formula (4):

[Chemical Formula 4]

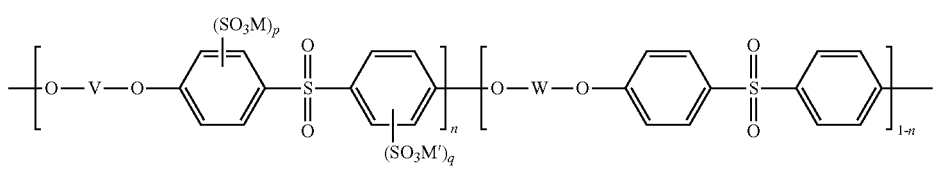

wherein n represents 0.01 to 0.1;

p and q each are an integer from 0 to 4, while p and q are not zero (0) at the same time;

M and M' each independently are any one selected from the group consisting of a hydrogen atom, a metal cation and an ammonium cation; and V and W each independently are a divalent organic group of the following Chemical Formula (5):

[Chemical Formula 5]

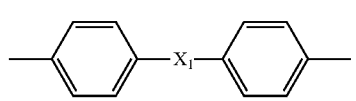

wherein $X_1$ is a single bond, or represents any one selected from the group consisting of an alkylene group having 1 to 5 carbon atoms and a fluoroalkylene group having 1 to 5 carbon atoms.

3. The method according to claim 1, wherein the eliminating protective groups is carried out by acid-treating the nanoweb structure.

4. The method according to claim 1, wherein the heat treating the electric spinned first solution is carried out at a temperature of 100° C. to 250° C. for a period of time of 1 minute to 1 hour.

5. The method according to claim 1, wherein the first hydrocarbon-based ion conductor is a sulfonated polyether ether ketone-ether sulfone block copolymer or a sulfonated polyether ether ketone-ether sulfone random copolymer and has a degree of sulfonation of 1 mol % to 40 mol %.

* * * * *